(12) United States Patent
Sivanthi et al.

(10) Patent No.: US 11,070,583 B2
(45) Date of Patent: Jul. 20, 2021

(54) AUTOMATIC COMMUNICATION NETWORK SYSTEM HARDENING

(71) Applicant: ABB Schweiz AG, Baden (CH)

(72) Inventors: Thanikesavan Sivanthi, Birmenstorf (CH); Thomas Locher, Zürich (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/559,791

(22) Filed: Sep. 4, 2019

(65) Prior Publication Data
US 2020/0007572 A1 Jan. 2, 2020

Related U.S. Application Data

(63) Continuation of application No. PCT/EP2018/055676, filed on Mar. 7, 2018.

(30) Foreign Application Priority Data

Mar. 7, 2017 (EP) .................................. 17159599

(51) Int. Cl.
*H04L 29/06* (2006.01)
(52) U.S. Cl.
CPC ...... *H04L 63/1433* (2013.01); *H04L 63/0263* (2013.01); *H04L 63/105* (2013.01); *H04L 63/1408* (2013.01); *H04L 63/1441* (2013.01); *H04L 63/20* (2013.01)
(58) Field of Classification Search
CPC ... G06F 21/57; G06F 21/577; H04L 63/1433; H04L 63/0263; H04L 63/105; H04L 63/1408; H04L 63/1441; H04L 63/20
See application file for complete search history.

(56) References Cited

U.S. PATENT DOCUMENTS

| | | | |
|---|---|---|---|
| 7,891,000 B1 * | 2/2011 | Rangamani | ......... H04L 63/1416 726/22 |
| 7,966,659 B1 | 6/2011 | Wilkinson et al. | |
| 2004/0117624 A1 * | 6/2004 | Brandt | .................. H04L 69/329 713/166 |

(Continued)

OTHER PUBLICATIONS

Han et al., "Mining Frequent Patterns without Candidate Generation," ACM Sigmod Record, vol. 29, No. 2, ACM, 2000, 12 pp.

(Continued)

*Primary Examiner* — Thaddeus J Plecha
(74) *Attorney, Agent, or Firm* — Taft Stettinius & Hollister LLP (57) ABSTRACT

A method for automatically improving security of a network system includes: collecting security relevant information from network devices of the network system, the security relevant information including security settings and operational information of the network devices; analyzing the security relevant information for determining weak security settings of a network device, the weak security settings being not necessary for a regular operation of the network system; determining hardened security settings for the network devices based on the weak security settings, the hardened security settings restricting a possible operation of the network device but allow a regular operation of the network system; and applying the hardened security settings to the network device.

19 Claims, 3 Drawing Sheets

(56) References Cited

U.S. PATENT DOCUMENTS

| | | | | |
|---|---|---|---|---|
| 2007/0143847 | A1* | 6/2007 | Kraemer | H04L 63/1441 726/23 |
| 2010/0077471 | A1* | 3/2010 | Schleiss | G05B 19/0428 726/13 |
| 2012/0278851 | A1 | 11/2012 | Dan | |
| 2013/0097706 | A1 | 4/2013 | Titonis et al. | |
| 2013/0166729 | A1* | 6/2013 | Gole | G06F 16/273 709/224 |
| 2015/0135265 | A1 | 5/2015 | Bagrin | |
| 2015/0339112 | A1* | 11/2015 | Ryu | G06F 11/324 717/174 |
| 2018/0068241 | A1* | 3/2018 | Varkey | H04L 63/1433 |

OTHER PUBLICATIONS

Hochberg et al., "NADIR: An Automated System for Detecting Network Intrusion and Misuse," Computers & Security, vol. 12, 1993, pp. 235-248.

European Patent Office, International Search Report & Written Opinion issued in corresponding Application No. PCT/EP2018/055676, dated May 30, 2018, 13 pp.

Han et al., "Mining Frequent Patterns without Candidate Generation," ACM Sigmod Record, Nov. 1, 2016, vol. 29, No. 2, ACM, 2000, 12 pp.

Hochberg et al., "NADIR: An Automated System for Detecting Network Intrusion and Misuse," Computers & Security, Nov. 1, 2016, vol. 12, 1993, pp. 235-248.

"Powerful infrastructure automation and delivery," Puppet, General Internet Website, https://puppet.com, Nov. 1, 2016.

"Puppet OS hardening," Puppet Forge, Retrieved from the Internet: https://forge.puppet.com/hardening/os_hardening, Nov. 1, 2016.

"The Bastille Hardening program: increased security for your OS," Bastille Linux, Retrieved from the Internet: https://bastille-linus.sourceforge.net, Nov. 1, 2016.

"Microsoft Baseline Security Analyzer," MBSA, TechNet Security, Microsoft Docs, Retrieved from the Internet: https://docs.microsoft.com/en-us/previous-versioi=ns/cc184924(v=msdn.10)?redirectedfrom=MSDN, Nov. 1, 2016.

* cited by examiner

AUTOMATIC COMMUNICATION NETWORK SYSTEM HARDENING

FIELD OF THE INVENTION

The invention relates to the field of security of communication network systems. In particular, the invention relates to a method, a computer program and a network hardening system for automatically improving a security of a network system. Additionally, the invention relates to a network system.

BACKGROUND OF THE INVENTION

Nearly all industrial systems nowadays comprise numerous computing devices that are communicatively interconnected with each other and with external devices. Every device of such a network system may have security settings, which control the allowed operations and the allowed communication with other devices. However, after installation, the security settings may be incorrect or only partially set.

For improving the security of a network system, the network system may be "hardened", which, among others, may mean the process of evaluating the installed software, running applications and processes, and access points for external access and reducing the attack surface by limiting the installed software, processes, and access points to the absolute minimum that is required to carry out the required tasks.

Currently, network systems are typically hardened during the commissioning phase and little or no hardening is performed on the systems in operation. However, a manual hardening process in the commissioning phase may be challenging and error prone. Furthermore, even if there is some degree of automation, the rules that are applied may be incorrect or only partially applicable to a given network system, which may be hard to detect when setting up a system.

Furthermore, it may be that parts of the network system can change during its lifetime, for example devices may be added or replaced, or the configuration of some devices may be modified. An initial hardening may no longer be valid or may be incomplete for the changed network system.

US 2013/097706 relates to security for mobile devices and to automated application analysis using an instrumented sandbox and machine learning classification to assess mobile application security.

U.S. Pat. No. 7,966,659 B1 relates to a distributed learn method for configuring a firewall. Traffic information is collected from distributed sources during a learn mode. The information is converted into a system context, security rule can be created from the system context and the security rules can be automatically applied to the firewall.

US 2015/135 265 A1 relates to automatic network firewall policy determination. A template compiler can automatically determine network security policies from business tools that have been selected by a user. A firewall can monitor traffic and can update the security policies based on the traffic, by tightening network security.

DESCRIPTION OF THE INVENTION

It is an objective of the invention to provide network systems with higher security. A further object of the invention is to simplify the hardening of network systems.

These objectives are achieved by the subject-matter of the independent claims. Further exemplary embodiments are evident from the dependent claims and the following description.

An aspect of the invention relates to a method for automatically improving security of a network system. A network system may be any system of computational devices interconnected with each other via a communication network. The computation devices, which may be called network devices in the following, may be devices solely supporting the communication in the network system, such as routers, switches and firewalls, and/or may be devices communicating with each other, such as PCs, servers, controllers, intelligent electronic devices, smart devices, etc.

Here and in the following, the term "automatically" may describe that the method may be performed by a computational device without direct interference of a human being. For example, the method may be performed by one or more devices of the network system and/or by one or more devices interconnected with the network system.

According to an embodiment of the invention, the method comprises: collecting security relevant information from network devices of the network system, the security relevant information including security settings and operational information of the network devices.

Security relevant information may be any data associated with security aspects of the network system. For example, security relevant information may be stored in a log file, which is produced by a process, when performing its tasks. As a further example, security relevant information may be stored in a configuration file, which is used for configuring one or more processes. Here and in the following, a process may be a computer program or a part of a computer program, such as a function or procedure that is executed in one or more computational devices, such as a network device.

Security relevant information may be divided into security settings and operational information. Security settings may encode what a device and/or a process are allowed to do and what not. Operational information may encode what a device and/or a process actual does. For example, security settings may encode that a device and/or process may establish communication via a specific network port. Corresponding operational information may be which ports the device and/or process actually uses.

The collection of the security relevant information may be performed continuously and/or regularly. In particular, the collection may be performed during operation of the network system. It also may be that the method and/or the collection of security relevant information is triggered by a hardware change and/or an installation change of the network system. Any time a device is interconnected or disconnected to the network system, the method may be triggered. Furthermore, when a software installation in a network device changes, the method may be triggered.

The collection of the security relevant information may be performed by one or more monitoring processes, which may be responsible for a periodic collection of current system information from all network devices of the network system. The one or more monitoring processes may be run in one or more networking devices, for example they also may monitor themselves, and/or may be run in an external device connected to the network system.

According to an embodiment of the invention, the method furthermore comprises: analyzing the security relevant information for determining weak security settings from collected security settings of a network device. Weak security settings may be settings not necessary for a regular operation of the network system. Weak security settings may be security settings that allow operations of the network devices that may not be needed for a regular operation. For example, weak security settings may allow processes that do not need to be run and/or may allow communication among devices that are not needed for regular operation of the system. Weak security settings may be seen as not optimal and/or not maximally secure security settings.

For example, a result of the analysis may be determined that a networking device only sends via a set of specific ports, but that all ports are allowed for communication. Thus, the security setting "all ports" allowed may be seen as weak security settings. As a further example, the analysis may have determined that only specific roles are necessary for running all processes that are executed by a networking device, but that more roles are assigned to the networking device. In this case, the roles not necessary for running the processes may be seen as weak security settings.

The regular operation of the network system may be determined from the collected operational information, i.e. the regular operation used for determining weak security settings may be in accordance with the operational information. For example, when the operational information indicates that a port is never used during a specific time period, such as a day or a week, it may be assumed that the regular operation is to never use this port. Thus, security settings allowing to communicate via this port may be seen as weak.

The analysis of the security relevant information may be performed by one or more analysis processes that may be coordinated by a coordination process. For example, once new security relevant information has been collected and/or after a certain time has elapsed, the one or more monitoring processes may instruct the coordinator process to analyze the new security relevant information.

For example, the coordinator process may be executed in a computational device that also stores the one or more analysis processes, which are used to determine the weak security settings. The coordinator process may trigger the execution of the analysis processes that, for example, may be executed in the same computational device as the coordinator process or one or more other computational devices that may be part of the network system and/or may be external devices, which need not be directly interconnected with the networking system.

According to an embodiment of the invention, the method furthermore comprises: determining hardened security settings for the network device based on the weak security settings, the hardened security settings restricting a possible operation of the network device but allow a regular operation of the network system in accordance with the operational information, wherein the hardened security settings are determined by restricting weak security settings. Hardened security settings may be seen as restricted security settings and/or more secure security settings.

Security settings may be restricted by removing a security setting that allows a specific operation and/or by adding a security setting that prohibits a specific operation.

For example, the hardened security settings of a network device may be improved security settings, e.g., improvements to settings that were weak initially, and additional settings to make the system more secure. Continuing the examples above, hardened security settings may be security settings with network ports restricted to only those ports, which are used for sending data. Furthermore, hardened security settings may be security settings restricted to roles, which allow the execution of all processes in a network device that already have been executed, but not processes that not have been executed.

The generation of the hardened security settings may be performed by one or more generator processes, which may be triggered by the coordinator process, when the corresponding analysis processes are finished. It also may be that a generator process is part of the corresponding analysis process. The one or more generator processes may be executed in the same computational device as the coordinator process or one or more other computational devices that may be part of the network system and/or may be external devices, which need not be directly interconnected with the networking system.

According to an embodiment of the invention, the method furthermore comprises: applying the hardened security settings to the network device. For example, the one or more configuration files, which are stored in a network device and/or contain the actual security settings of a network device, may be changed based on the hardened security settings. It also may be that software may be deleted from a networking device, when it has been determined that the execution of the software is not needed.

For example, the application of the hardened security settings may be performed by the coordinator process. The coordinator process may have the permissions to perform the corresponding changes with respect to the network devices. Furthermore, the coordinator process may inform an administrator (a human being) about the proposed changes to the system configuration based on the hardened security settings.

Summarized, the network system together with the computational devices running the method may detect and remove vulnerabilities that may be discovered at any point in time when the network system is running, thereby increasing the security of the network system.

Using this method, a security level of a network system may be monitored and improved periodically or on demand. Furthermore, running network systems may be hardened through multiple checks that are adapted to accommodate changes in the network system and/or to counter new cyber security and robustness threats that can compromise the network system, even those not known when the network system has been set up.

In addition, the method may be used to automatically derive correct and complete system specific hardened security settings. Any incorrect or incomplete security settings in a system may be quickly detected by validating against derived project specific hardening settings, thereby reducing the engineering cost.

According to an embodiment of the invention, the method further comprises: permanently storing the security relevant information in at least one storage device for generating a history of security relevant information of the network system. The storage devices may be part of the network system or not. For example, the one or more monitoring processes may forward the collected security relevant information to the storage devices, which may be processes on physical devices, whose task is to store the data coming from the monitoring processes persistently and redundantly in order to avoid data loss in case of the failure of a storage device.

Furthermore, a history of security relevant information may be provided by the storage devices. In such a way, the one or more analysis processes may compare actual with previous security settings and/or actual with previous operational information. For example, it may be determined whether security settings have been changed without the knowledge of the monitoring and hardening system performing the method. Furthermore, operational information may be evaluated based on statistical methods, for example, network traffic may be analyzed over time.

The method steps described in the following may be performed by analysis and/or generator processes, which may be triggered by the coordinator process.

According to an embodiment of the invention, the method further comprises: determining a regular behavior of the network system from previously stored security relevant information. For example, the regular behavior may be determined with one or more of the analysis processes.

A regular behavior may be data encoding an operation of the network system without illegal operation caused by security threats. For example, it may be assumed that the network system most of the time has a regular behavior. The corresponding information may be extracted from the operational information using a statistical method.

Regular behavior may be data based on aggregated operational information of the network system. For example, regular behavior may comprise information about execution times of processes, network traffic between devices, etc.

According to an embodiment of the invention, the method further comprises: determining the weak security settings from the regular behavior. Based on the regular behavior, an analysis process may determine, which security settings are necessary for performing the regular behavior and which not. It may be possible that the information encoding regular behavior and the corresponding security settings are grouped into groups, which are analyzed by different analysis processes. Examples for such groups may be network traffic and port restrictions, executed processes, process execution times and a restriction of execution times, etc.

According to an embodiment of the invention, the method further comprises: determining irregular behavior of the network system by comparing actual collected security information with at least one of a regular behavior of the network system and previously stored security relevant information. Furthermore, when regular behavior has been determined (for example by the monitoring processes), the actual security relevant information and in particular the actual operational information may be analyzed in view of irregular behavior. For example, the same information generated with respect to regular behavior may be generated from the actual security relevant information, for example on a shorter time basis. By comparing the actually generated information with the information encoding the regular behavior, deviations may be detected and, when the deviation is higher than a threshold, irregular behavior may be detected.

For example, irregular behavior may be that network devices communicate with each other when they do not according to regular behavior. A further example of irregular behavior is that processes are executed on a network device for a longer time as indicated by regular behavior.

According to an embodiment of the invention, the method further comprises: stopping irregular behavior of the network system by applying changed security settings to network devices associated with the irregular behavior. It may be that the coordinator process, when being informed about irregular behavior, changes the settings of the concerned network devices, such that irregular behavior is not possible any more. For example, an analysis process may propose changed security settings based on the irregular behavior. These changed security settings may be implemented by the coordinator process.

For example, in the case that a network device starts to send much more data into the network system as indicated by the regular behavior, the security settings of the network device may be set to disallow any network traffic generated by the network device. This may cause a malfunction of the network device, but also may protect the remaining network system from the networking device, which may have been hijacked.

According to an embodiment of the invention, the security settings comprise at least one of: roles assigned to a user and/or a network device, rights of a role, firewall rules, opened/closed ports of a device, and/or installed processes on a device. It has to be noted that also other settings of network devices may be seen as security settings. It may be that the one or more monitoring processes are adapted to convert security settings, which may be encoded in different types of formats and/or storage types into a homogenous format that may be processed by the analysis processes.

According to an embodiment of the invention, the operational information comprises at least one of: a running process on a network device, a running time of a process on a network device, and/or a network traffic between network devices. Also this list does not exclude other types of operational information. Again, the monitoring processes may be adapted for converting the operational information, which may be collected in different formats and/or in different ways, for example from log files, into a homogenous format that may be processed by the analysis processes.

According to an embodiment of the invention, hardened security settings comprises at least one of: a removal of a role to a user and/or a device, a removal of rights from a role, a modification of firewall rules, a closing of a port of a network device, a termination or a start of a process on a device, a removal of a process from a network device, and/or a restricted running time of a process of a network device. The hardened security settings may be provided in a homogenous format and may be converted back into the specific formats that are needed for implementing the security settings in the respective network devices.

The method and/or the different processes performing the method may be performed in different ways and/or in different virtual and/or physical computing devices. For example, the one or more monitoring processes may be executed in a monitoring device, which is not part of the network system.

According to an embodiment of the invention, the security relevant information is collected by a monitoring device interconnected with the network system, which retrieves the security relevant information from the network device. The monitoring device may contact the network devices itself and/or may retrieve the desired information, for example by logging into the network devices using a secure mechanism such as SSH.

According to an embodiment of the invention, the security relevant information of a network device is collected by a monitoring process installed in the network device, which sends the security relevant information to a monitoring device. The monitoring processes may be directly performed in the network devices, which may retrieve local information and send it to a further monitor device and/or directly to one or more storage devices.

According to an embodiment of the invention, the security relevant information is analysed and changed security settings are applied by a network hardening device connected to the network system. It also may be that the coordinator process and the one or more analysis processes are performed in one or more devices separate from the network system.

A further aspect of the invention relates to a computer program adapted for performing the method, when executed on at least one processor, and to a computer-readable medium on which such a computer program is stored. The computer program may be seen as the collection of monitoring processes, coordinator process, and analysis processes. The computer-readable medium may be the non-volatile storage of the devices running these processes.

A further aspect of the invention relates to a network monitoring and hardening system comprising at least one monitoring device, at least one analysis device, and at least one hardening device. Furthermore, the network monitoring and hardening system may comprise at least one storage device for storing the collected security relevant information.

The at least one monitoring device may be adapted for running the at least one monitoring process and/or may be adapted for collecting security relevant information from network devices of the network system, the security relevant information including security settings and operational information of the network devices.

The at least one analysis device may be adapted for the at least one analysis process. Furthermore, the at least one analysis device may be adapted for analysing the security relevant information for determining weak security settings of a network device, the weak security settings being not necessary for a regular operation of the network system.

Additionally, the at least one analysis device may be adapted for determining hardened security settings for the network device based on the weak security settings, the hardened security settings restricting a possible operation of the network device but allowing a regular operation of the network system.

The at least one hardening device may be adapted for running the coordinator process and/or for applying the hardened security settings to the network device.

The one or more monitoring devices, the one or more analysis devices and/or the hardening device may be physical devices and/or may be implemented as computational node or virtual device. Also the one or more storage devices may be implemented as physical devices and/or may be implemented as computational node or virtual device. It is possible to co-locate analysis nodes and/or storage nodes on the same physical devices, which may reduce the computation time because each analysis node can potentially load some of the required security relevant information from local storage.

A further aspect of the invention relates to a network system comprising a plurality of network devices, which are communicatively connected and a network monitoring and hardening system as described in the above and in the following. As already mentioned, the network monitoring and hardening system may be implemented partially or completely within devices of the network system.

According to an embodiment of the invention, the network system is an industrial automation system. The network devices may be industrial automation devices. For example, the network system may comprise actuation, sensor and control devices of a substation of an electrical grid.

It has to be understood that features of the method as described in the above and in the following may be features of the computer program, the monitoring and hardening system and the network system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
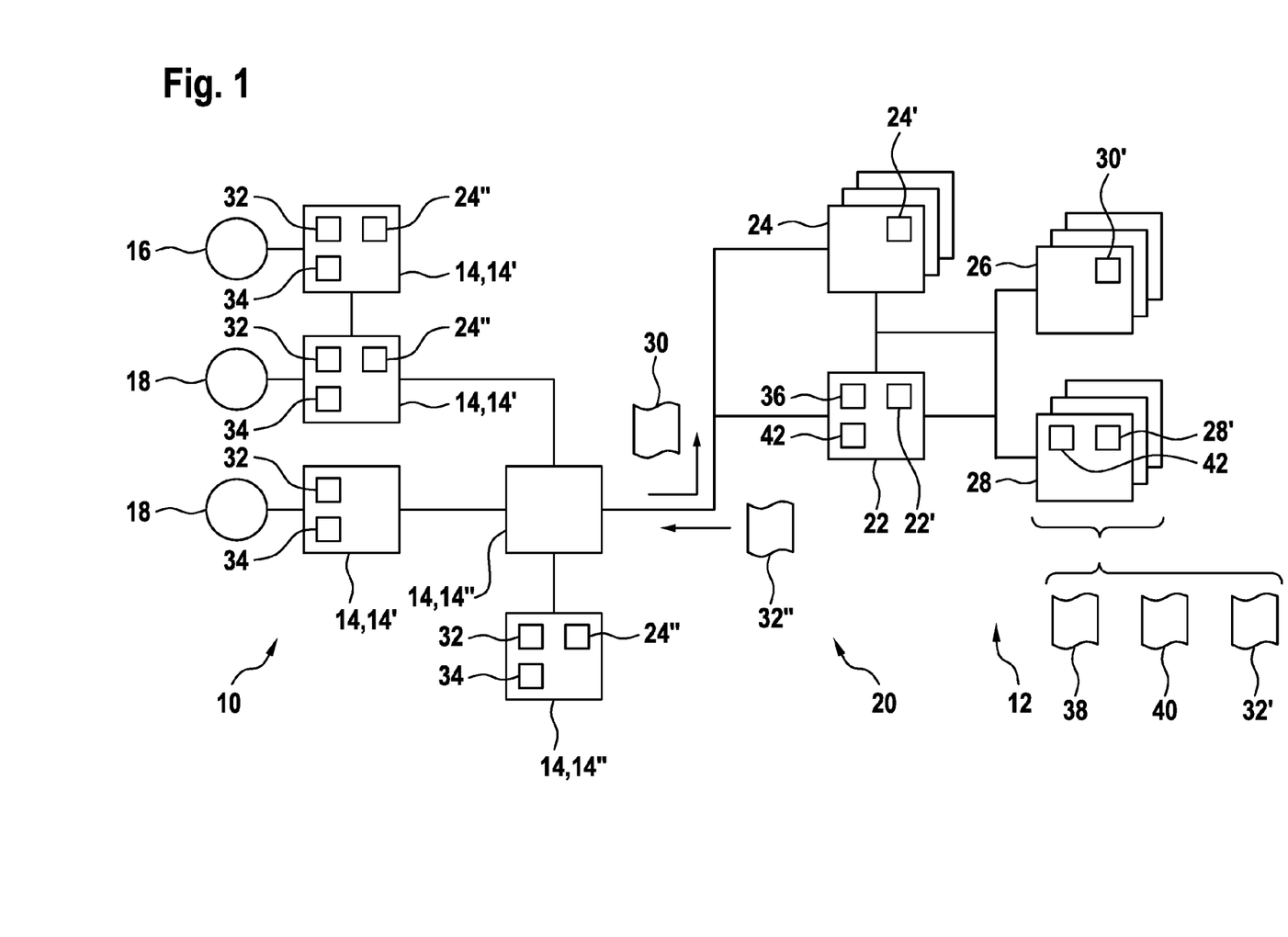
FIG. 1 schematically shows a network system and a monitoring and hardening system according to an embodiment of the invention.

FIG. 1 shows a network system 10 connected with a monitoring and hardening system 12. The system 12 may be part of the system 10.

The network system 10 comprises a plurality of network devices 14, which, for example, may be controllers 14' of sensors 16 or actuators 18. Furthermore, the network system 10 may comprise further computational devices 14, 14", which are solely used for interconnecting the controllers 14', such as a switch, and/or for performing computational tasks, such as a central supervision computer. For example, the network system 10 may be an industrial automation system, such as the control system of an electrical substation. However, it also may be possible that the network devices 14 are PCs or other multi-purpose computation devices and that the network system 10 is an Intranet of a company, a cloud computing facility, etc.

The network devices 14 are interconnected with a communication network 20, which also connects the monitoring and hardening system 12 with the network system 10.

The monitoring and hardening system 12 comprises one or more coordinator devices 22, one or more monitoring devices 24, one or more storage devices 26 and one or more analysis devices 28.

It has to be noted that the devices 22, 24, 26, 28 may be distinct physical computational devices, may be virtual devices and/or that the tasks of two or more of the devices 22, 24, 26, 28 may be performed by one physical device. It also may be that some or all of the devices 22, 24, 26, 28 are parts of the network system 10.

In the monitoring devices 24, one or more monitoring processes 24' are performed, which collect actual security relevant information 30 from the network devices 14. It may be that some or all of the network devices have security agents 24 which may be seen as parts of a monitoring process 24', which send the security relevant information 30 to the monitoring devices 24' and/or directly to the storage devices 26.

The security relevant information 30 then may be persistently stored in the storage devices 26 as historized security relevant information 30'.

Security relevant information 30 may be composed of security settings 32 of network devices 14 and of operational information 34 of network devices 14.

For example, security settings 32 may be stored in configuration files and/or may be retrieved from data configuring a network device 14. Examples of security settings 32 are rights and/or roles of a network device or a process, opened and closed ports, installed software, etc.

Operational information 34 may be information during operation of a network device 14. For example, operational information may be stored in log files and/or may be retrieved from data produced during operation of a network device 14. Examples of operational information 34 are network traffic, source and destination of network traffic, amount of network traffic, used ports, started processes, running process, stopped processes, running times of processes, etc.

In the coordinator device 22; a coordinator process 22' runs periodically or on demand, executing analysis processes 28' on the analysis devices 28. For example, in the coordinator device 22, a task list 36 is stored, which may schedule the analysis processes 28' to be run.

The analysis processes 28' analyze the stored security relevant information 30' for determining a regular behavior 38 of the network system 10, for weak security settings 32', and for an irregular behavior 40 of the network system 10. It may be that the analysis processes 28' are run on the same physical device, where also the relevant security information 30' to be analyzed is stored.

Based on the analysis results, hardened security settings 32" may be calculated by a generator process 42, which may run in the analysis device 28 and/or the coordinator device 22. The hardened security settings 32 may be applied to the corresponding network devices 14 by the coordinator process 22', which may have the rights to change the corresponding security settings 32 in the respective network devices 14. In such a way, the device 22 also may be seen as a hardening device 22.

It may be that a security agent 24" in the corresponding device 14 applies the hardened security settings 32".

The analysis results 38, 40, 32' also may be sent to an administrator.

Figure 2:
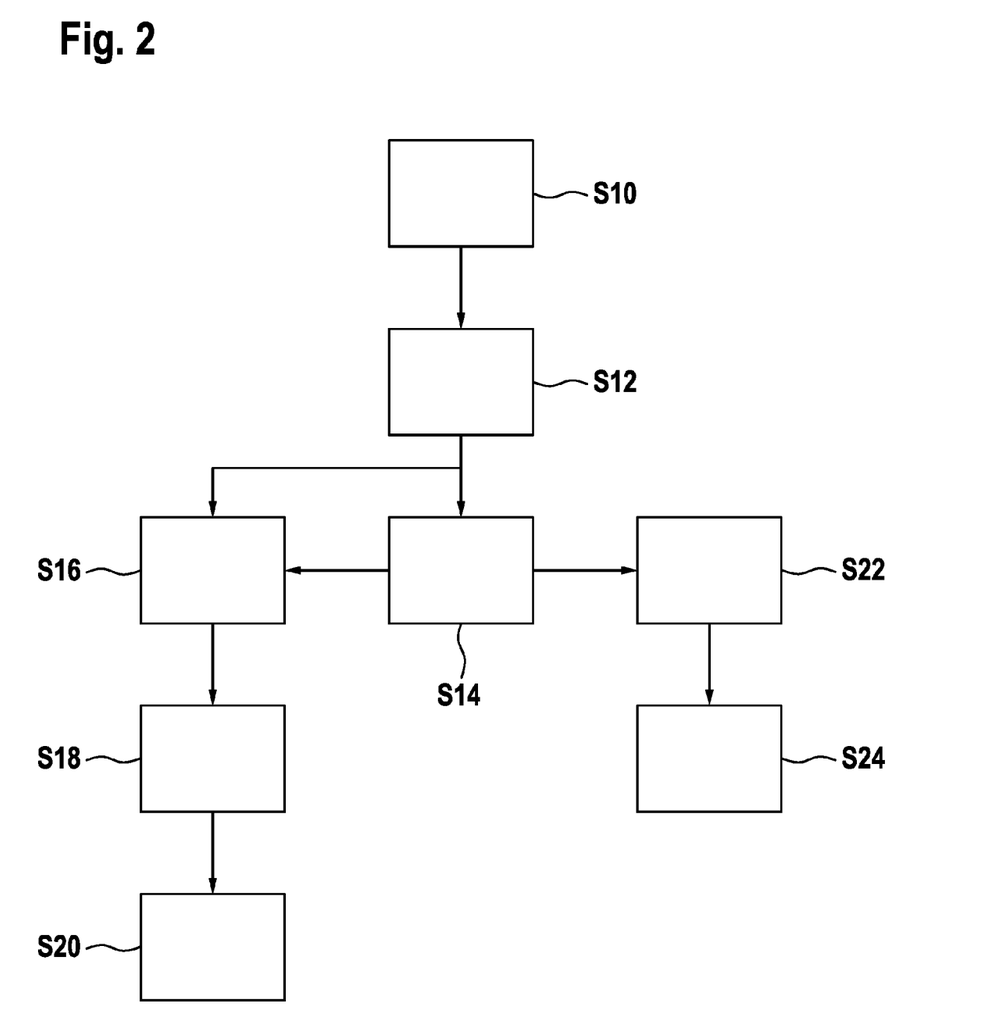
FIG. 2 shows a flow diagram for a method for improving the security of a network system according to an embodiment of the invention.

FIG. 2 shows a flow diagram for a method for automatically improving the security of the network system 10, which may be performed by the monitoring and hardening system 12.

In step S10, the monitoring and hardening system 12 collect security relevant information 30 from the network devices 14 of the network system 10.

As already mentioned, the security relevant information 30 may be collected by the one or more monitoring devices 24, which retrieves the security relevant information 30 from the network device 14. Alternatively or additionally, the security relevant information 30 may be collected by a monitoring process 24" or monitoring agent 24" installed in the network device 14, which sends the security relevant information 30 to a monitoring device 24.

The security relevant information 30 and in particular the security settings 32 and the operational information may be converted into a common format that may be processed by the storage devices 26 and/or the analysis devices 28.

It has to be noted that during step S10 and the following steps, the network system 10 may be in a normal operation mode, i.e. the method may be performed not only during the commission phase of the network system 10.

In step S12, the actual collected security relevant information 30 is permanently stored in the one or more storage device 26. In such a way, a history of security relevant information 30' of the network system 10 may be generated. The history of security relevant information 30' may be unique for the network system 10. It may encode topological changes of the network system 10, changes in the security settings 32, which may be triggered by the system 12 or may be caused by manual changes of the network devices 14.

The following steps S14, S16, S18 and S22 may be performed by analysis processes 28' that may have been triggered by the coordinator process 22'.

In step S14, a regular behavior 38 of the network system 10 is determined from previously stored security relevant information 30'. The regular behavior 38 of the network system may be encoded in standardized form and/or may include information about processes being executed in network devices 14 and/or communication between network devices.

Regular behavior 38 may include processes usually running in network devices and information based on this, such as usual process start time, usual process end time, usual process running time, etc. Regular behavior 38 also may include network traffic between network devices and information based on this, such as usual sender and/or usual receivers of data packets, number of sent data packets, amount of traffic, ports used for traffic, etc.

For example, regular behavior 38 may include when certain operations and/or processes are carried out normally. This may allow the system 12 to specify rules as to when the operations are allowed. From such rules, hardened security settings 32" may be derived in step S18.

The determination of regular behavior 38 may be based on machine learning algorithms, which may group the collected information 30' into groups and which may also distinguish regular behavior 38 from irregular behavior 40, which will be described with respect to step S22.

Note that determination of regular behavior 38 may be a prerequisite for the determination of weak security settings 32'.

In step S16, the security relevant information 30' is analyzed for determining weak security settings 32' of a network device 14. Weak security settings 32' may be characterized by being not necessary for a regular operation of the network system 10.

The weak security settings 32' may be determined from the regular behavior 38 based on rules that may be encoded into different analysis processes. In general, such a rule may determine that a security setting 32 that allows operations that are not performed according to regular behavior 38 should be avoided.

Such rules may include that a network device 14 may have the rights to run processes that are not run according to the regular behavior 38, that a network device may not have ports opened that are not used according to regular behavior 38, etc.

For example, an analysis process 28' may determine the rights required for a network device 14 to perform its regular operations. These rights may be compared with the rights set in the security settings and potential role changes may be derived. For example, such roles and/or right changes may be performed with a machine learning/optimization algorithm, which, for example, enables the computation of minimal access rights for roles.

Examples of weak security settings in this context may be a role of a user and/or a network device 14, which allows it to execute commands and/or processes that perform operations that go beyond any operation that it actually performs in regular operation, therefore the role of this user and/or network device 14 can be changed to a more restrictive role. Another example is a role that enables to perform more operations than required for regular behavior 38. As a result, the rights of this role can be restricted.

Another analysis process 28' may determine a minimal flow of information between the network devices 14 that is needed to carry out all regular operations according to regular behavior 38. In this context, weak security settings 32 may be port settings and/or multicast filter settings that allow sending of data between network devices 14 that do not communicate according to regular behavior 38.

Computing the required information flow may enable the hardening of routers 14", switches 14" and/or firewalls 14" by restricting connectivity to a required minimum. The information flow may also be used to deduce which open ports and running processes are required.

For example, suppose that a network device 14' may communicate with another device 14' according to firewall rules, but no communication between these devices ever occurs according to regular behavior 38. In this case, a firewall 14" may be hardened by disallowing any communication between these devices 14'.

In step S18, hardened security settings 32" for one or more network devices 14 are determined based on the weak security settings 32'. Hardened security settings 32" may be seen as security settings 32 that restrict a possible operation of the network device 14 but allow a regular operation of the network system 10. In other words, with optimal hardened security settings 32', only regular behavior 38 of the network system 10 is possible.

The hardened security settings 32" may be generated from the actual applied security settings and the determined weak security settings 32' with the generator process 42. For example, such hardened security settings 32" may include an optimal specification of rights for each role and/or the allocation of roles to users and/or network devices 14 so that all regular operations can be performed.

In step S20, the hardened security settings 32" are applied to the concerned network devices 14. For example, this may be done by the coordinator process 22' or the hardened security settings 32" may be sent to security agents 24" inside the network devices 14, which apply the hardened security settings 32".

In step S22, an irregular behavior 40 of the network system 10 is determined by an analysis process 28' by analyzing actual collected security information 30. For example, the actual collected security information 30 may be compared with the regular behavior 38 of the network system 10 and/or with the previously stored security relevant information 32'.

Examples for such irregular behavior 40 may be network devices 14 that start to communicate, although they should not to regular behavior 38 and/or processes started that usually do not run at the specific times indicated by regular behavior 38.

When irregular behavior 40 is detected, an administrator may be informed.

In step S24, the irregular behavior 40 is stopped by applying changed security settings 32" to network devices 14 associated with the irregular behavior 40. Analogously to the hardened security settings 32", which are determined for disallowing operations not being part of the regular behavior, also changed security settings 32" may be generated, for example with a generator process 42, which disallows specific irregular behavior 40. The changed security settings 32" may be applied to the concerned network devices 14, such as the hardened security settings 32".

Figure 3A:
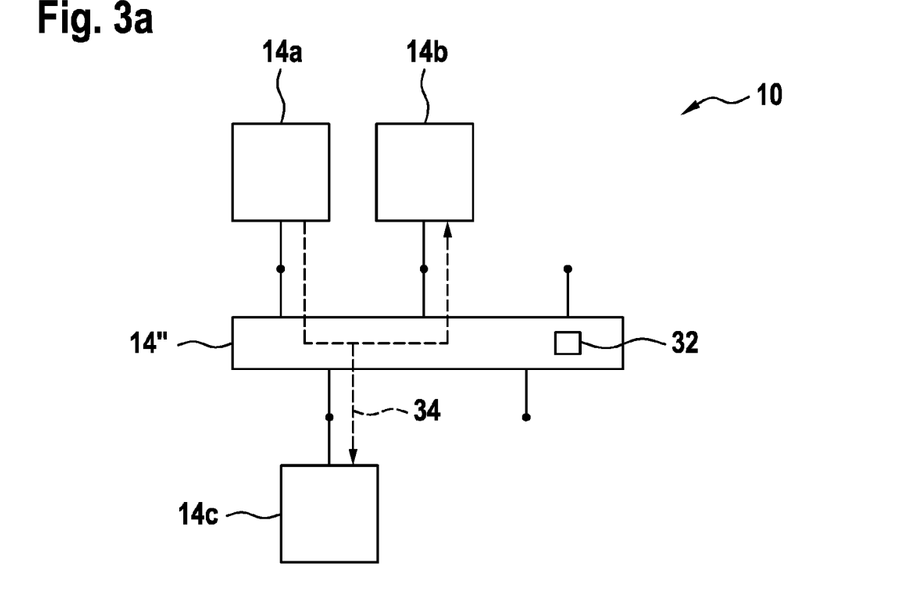
FIGS. 3a and 3b schematically show a network system according to an embodiment of the invention.
Figure 3B:
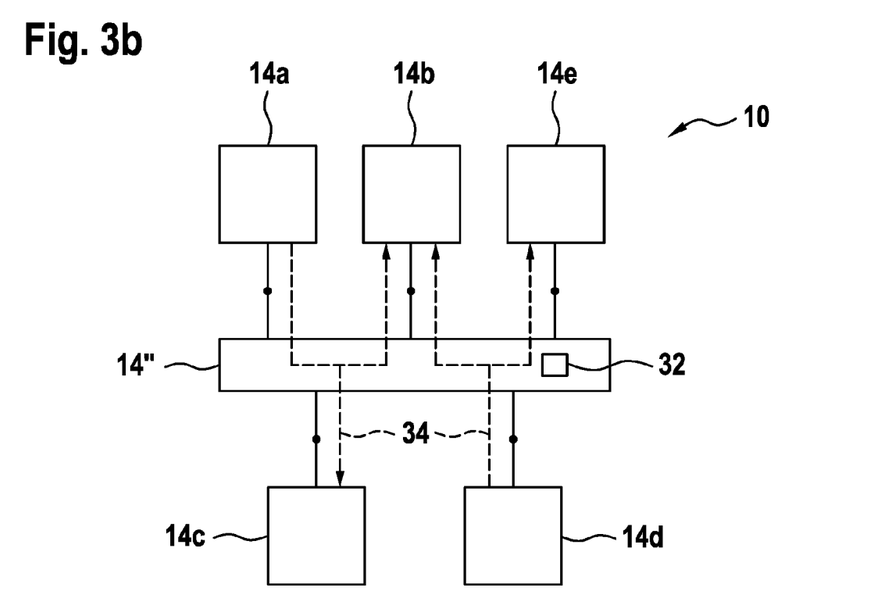

FIGS. 3a and 3b show an embodiment, in which the method optimizes network settings 32 of a network device 14" of a network system 10 that, as shown in FIG. 3a in an initial configuration, comprises three network devices 14a, 14b and 14c that are interconnected via the network device 14" that is a network switch.

Network device 14a sends a multicast message to network devices 14b, 14c. Firstly, the switch 14" is configured with no multicast filter settings 32, and the switch 14" by default forwards the multicast message from network device 14a to network devices 14b, 14c.

The system 12 of FIG. 1 collects the multicast filter settings 32 as security settings and the network traffic through the switch 14" as operational information 34. After an analysis of the generated security relevant information 30, it is determined that the unused ports that however are not closed are weak security settings 32'. Thus, hardened security settings 32", with only opened ports, are generated and after application of the hardened security settings 32", the unused ports of switch 14" are disabled for security reasons.

As shown in FIG. 3b, the network system 10 of FIG. 3a is expanded to include network devices 14d and 14e that are connected to the unused (previously disabled) ports of switch 14. For example, after installing the new network devices 14d and 14e, a service technician has reset the switch to its original security settings 32.

Network device 14d now additionally sends a multicast message to network devices 14b and 14e. All ports of the switch 14" are now in use, so the system 12 of FIG. 1 may determine that no ports need to be closed.

However, as the switch 14" does not have any multicast filters as security settings 32 set, it will also forward the multicast messages from network device 14a to network device 14d and vice versa, although the messages are not destined to reach network devices 14d or 14a. This, on the one hand, may lead to security issues, and, additionally, may lead to performance issues in network devices 14a and 14d, especially when the frequency of the multicast messages is high, which may result in unnecessary CPU interrupts. Both issues may be addressed with the method described with respect to FIG. 2.

In particular, the operational information 34 about packets that are filtered or dropped in a network device 14 may be collected by a monitor agent 24" running on the network device 14 or more generally the monitoring processes 24'. This security relevant information 30' may be logged in the storage devices 26.

An analysis process 28' in the form of a machine learning process then may be used to learn about the different multicast groups from this security relevant information 30'. For example, a data mining algorithm may be chosen to find frequent item sets, such as a frequent pattern growth algorithm. In the example of FIG. 3b, such an analysis process 28' will find two multicast groups. Based on this learning, the security settings 32 of switch 14' may be updated in the following way: hardened security settings 32" may comprise two multicast filter settings: one that forwards the multicast message from network device 14a to only network device 14b and network device 14c and another one that forwards the multicast message from network device 14d to only network device 14b and network device 14e.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope.

LIST OF REFERENCE SYMBOLS 10 network system
12 monitoring and hardening system
14 network device
14a network device
14b network device
14c network device
14d network device
14e network device
14' controller
14" computational device, switch, router, firewall
16 sensor
18 actuator
20 communication network
22 coordinator device/hardening device
22' coordinator process
24 monitoring device
24' monitoring process
24" security agents
26 storage device
28 analysis device
28' analysis process
30 actual security relevant information
30' history of security relevant information
32 actual applied security settings
32' weak security settings
32" changed and/or hardened security settings
34 operational information
36 task list
38 regular behavior
40 irregular behavior
42 generator process

The invention claimed is:

1. A method for automatically improving security of a network system, the method comprising:
collecting security relevant information from network devices of the network system, the security relevant information including security settings and operational information of the network devices, wherein collecting the security relevant information is performed by one or more monitoring processes;
determining a regular behavior of the network system from previously stored security relevant information;
when security relevant information has been collected, instructing a coordinator process to analyze the security relevant information by the one or more monitoring processes;
analyzing the security relevant information for determining weak security settings from collected security settings of a network device and from the regular behavior, the weak security settings being not necessary for a regular operation of the network system in accordance with the operational information, wherein analyzing the security relevant information is performed by analysis processes that are coordinated by the coordinator process, wherein information encoding regular behavior and corresponding security settings are grouped into groups, which are analyzed by different analysis processes;
determining hardened security settings for the network device based on the weak security settings, the hardened security settings restricting a possible operation of the network device but allow a regular operation of the network system in accordance with the operational information, wherein the hardened security settings are determined by restricting weak security settings;
applying the hardened security settings to the network device.

2. The method of claim 1, further comprising:
permanently storing the security relevant information in at least one storage device for generating a history of security relevant information of the network system.

3. The method of claim 2, further comprising:
determining irregular behavior of the network system by comparing actual collected security information with at least one of a regular behavior of the network system and previously stored security relevant information;
stopping irregular behavior of a network system by applying changed security settings to network devices associated with the irregular behavior.

4. The method of claim 1,
wherein the security settings comprise at least one of:
roles assigned to a user and/or a network device,
rights of a role,
firewall rules,
opened/closed ports of a network device,
installed and/or running processes on a network device.

5. The method of claim 1,
wherein the operational information comprises at least one of:
a running process on a network device,
a running time of a process on a network device,
network traffic between network devices.

6. The method of claim 1,
wherein hardened security settings comprise at least one of:
a removal of a role to a user and/or a network device,
a removal of rights from a role,
a modification of firewall rules,
a closing of a port of a network device,
a termination of a process on a network device,
a removal of a process from a network device,
a restricted running time of a process of a network device.

7. The method of claim 1,
wherein the security relevant information is collected by a monitoring device interconnected with the network system, which retrieves the security relevant information from the network device.

8. The method of claim 1,
wherein the security relevant information of a network device is collected by a monitoring process installed in the network device, which sends the security relevant information to a monitoring device.

9. The method of claim 1,
wherein the security relevant information is analysed by an analysis device and changed security settings are applied by a network hardening device connected to the network system.

10. The method of claim 4, wherein the operational information comprises at least one of: a running process on a network device, a running time of a process on a network device, network traffic between network devices.

11. The method of claim 10, wherein hardened security settings comprise at least one of: a removal of a role to a user and/or a network device, a removal of rights from a role, a modification of firewall rules, a closing of a port of a network device, a termination of a process on a network device, a removal of a process from a network device, a restricted running time of a process of a network device.

12. The method of claim 11, wherein the security relevant information is collected by a monitoring device interconnected with the network system, which retrieves the security relevant information from at least one of said network devices of the network system.

13. The method of claim 12, wherein the security relevant information is collected by a monitoring process installed in the at least one of said network devices of the network system, which sends the security relevant information to the monitoring device.

14. The method of claim 1, wherein the regular behavior of the network system is determined based at least in part on network traffic information.

15. The method of claim 1, wherein the regular behavior of the network system is determined based on a statistical determination of how the network system operates during a majority of a time period.

16. A non-transitory computer-readable medium for automatically improving security of a network system comprising:
a set of instructions configured to be executed by at least one processor effective to:
receive security relevant information from network devices of the network system, the security relevant information including security settings and operational information of the network devices, wherein the security relevant information is collected by one or more monitoring processes;
determine a regular behavior of the network system from previously stored security relevant information;
when security relevant information has been collected, instruct a coordinator process to analyze the security relevant information by the one or more monitoring processes;
analyze the security relevant information for determining weak security settings from collected security settings of a network device and from the regular behavior, the weak security settings being not necessary for a regular operation of the network system in accordance with the operational information, wherein analyzing the security relevant information is performed by analysis processes that are coordinated by the coordinator process, wherein information encoding regular behavior and corresponding security settings are grouped into groups, which are analyzed by different analysis processes;
determine hardened security settings for the network device based on the weak security settings, the hardened security settings restricting a possible operation of the network device but allow a regular operation of the network system in accordance with the operational information, wherein the hardened security settings are determined by restricting weak security settings;
apply the hardened security settings to the network device.

17. A network monitoring and hardened system, comprising:
at least one monitoring device including a first non-transitory computer-readable medium having a first set of instructions that, when executed by a first processor, is effective to collect security relevant information from network devices of a network system, the security relevant information including security settings and operational information of the network devices and, when security relevant information has been collected, instruct a coordinator process to analyze the security relevant information;
at least one analysis and hardening device including a second non-transitory computer-readable medium having a second set of instructions that, when executed by a second processor, is effective to:
determine a regular behavior of the network system from previously stored security relevant information;
run the coordinator process;
analyze the security relevant information for determining weak security settings of a network device and from the regular behavior, the weak security settings being not necessary for a regular operation of the network system, wherein analyzing the security relevant information is performed by analysis processes that are coordinated by the coordinator process, wherein information encoding regular behavior and corresponding security settings are grouped into groups, which are analyzed by different analysis processes;
determine hardened security settings for the network device based on the weak security settings, the hardened security settings restricting a possible operation of the network device but allow a regular operation of the network system;
apply the hardened security settings to the network device;
determine irregular behavior of the network system by comparing actual collected security information with at least one of the regular behavior of the network system and previously stored security relevant information;
stop irregular behavior of a network system by applying changed security settings to network devices associated with the irregular behavior.

18. A system, comprising:
a plurality of network devices, which are communicatively connected;
a network monitoring and hardening system according to claim 17.

19. The system of claim 18,
wherein the system is an industrial automation system;
wherein the plurality of network devices are industrial automation devices.

* * * * *